United States Patent [19]

Lidgren

[11] Patent Number: 4,910,804
[45] Date of Patent: Mar. 27, 1990

[54] HEAD GUARD AND METHOD FOR MAKING SAME

[75] Inventor: Lars A. Lidgren, Lund, Sweden

[73] Assignee: Sport Exclusive E.H. AB, Lund, Sweden

[21] Appl. No.: 229,886

[22] PCT Filed: Dec. 11, 1987

[86] PCT No.: PCT/SE87/00592

§ 371 Date: Aug. 11, 1988

§ 102(e) Date: Aug. 11, 1988

[87] PCT Pub. No.: WO88/04188

PCT Pub. Date: Jun. 16, 1988

[30] Foreign Application Priority Data

Dec. 11, 1986 [SE] Sweden .................. 8605308-9

[51] Int. Cl.⁴ .................................................. A42B 1/22
[52] U.S. Cl. ...................................... 2/209.3; 2/181.8; 2/197; 2/DIG. 11
[58] Field of Search ............ 2/171, 181, 182.5, 181.8, 2/197, 411, 414, 417, 418, 419, 420, DIG. 11, 170, 209.3, 192, 243 R

[56] References Cited

U.S. PATENT DOCUMENTS

| | | | |
|---|---|---|---|
| 662,645 | 11/1900 | Halbert | 2/181.8 |
| 1,330,789 | 2/1920 | Darmstadter | 2/182.5 X |
| 1,712,290 | 5/1929 | Buckman | 2/197 X |
| 4,499,741 | 2/1985 | Harris | 2/DIG. 11 X |
| 4,521,922 | 6/1985 | Mitchell et al. | 2/171 |
| 4,646,367 | 3/1987 | El Hassen | 2/411 |
| 4,656,671 | 4/1987 | Manges | 2/DIG. 11 X |
| 4,724,549 | 2/1988 | Herder et al. | 2/414 X |

FOREIGN PATENT DOCUMENTS

| | | | |
|---|---|---|---|
| 3005001 | 8/1981 | Fed. Rep. of Germany | 2/417 |
| 2305205 | 10/1976 | France | 2/411 |
| 2497443 | 1/1981 | France . | |
| 8404482-5 | 9/1984 | Sweden . | |
| 214635 | 8/1941 | Switzerland . | |
| 0686815 | 1/1953 | United Kingdom | 2/22 |

Primary Examiner—Peter Nerbun
Attorney, Agent, or Firm—Bacon & Thomas

[57] ABSTRACT

A head guard, preferably annular brow-band, comprising a longitudinal, preferably annular unit (2) which completely or substantially is made of cellular plastic. In order to ensure that all parts of the head guard provide adequate protection, the cellular-plastic unit (2) has depressions (12, 13) which protrude into the cellular-plastic material alternately from an inner side (14a) and an outer side (14b) respectively, of the unit, which inner side (14a) and outer side (14b) respectively, faces inwardly towards and outwardly from the head (15) respectively, whereby the depressions (12, 13) define cellular-plastic pads (16) with shock-absorbing properties and extending substantially transverse to the longitudinal direction (L) of the cellular-plastic unit (2) and whereby the cellular-plastic pads (16) and the connecting portions (17) connecting the pads together permit a limited stretching or elongation of the cellular-plastic unit (2) in its longitudinal direction (L) for providing at least one elastic portion (8–11) for adaptation to the size and/or shape of the cellular-plastic unit (2) and to the size and/or shape of the head (15) (FIG. 2). A simple and efficient method for manufacturing the cellular-plastic unit (2), includes pressing heated blades (24, 25) into the cellular-plastic unit (2) to provide depressions (12, 13) therein and bringing warm processing devices in contact with other parts of the cellular-plastic unit such that the unit receives a surface which is less porous than the portion disposed below the surface.

10 Claims, 4 Drawing Sheets

HEAD GUARD AND METHOD FOR MAKING SAME

The present invention relates to a head guard, preferably in the form of an annular brow-band comprising a longitudinal, preferably annular unit, which is completely or substantially completely made of cellular plastic. The invention also relates to a method for manufacturing such a head guard.

In DE-A1-30 05 001 there is described a head guard comprising plates of cellular plastic provided in a stocking of elastic material. The stocking is sewn together between the plates and permits stretching of the head guard for adaptation thereof to the size of the head. A problem of such head guards is that there are unprotected spaces between the plates and the width of these unprotected spaces increases with the stretching of the head guard.

The object of the present invention is to eliminate this problem and to obviate unprotected spaces at head guards of the abovementioned type.

Another object is to provide a simple and efficient method for manufacturing the head guard of the invention.

The invention shall be further described below with reference to the accompanying drawings, in which FIG. 1 is a perspective view of the head guard according to the invention in the form of an annular brow-band placed in working position around the head of a person;

Figure 3:
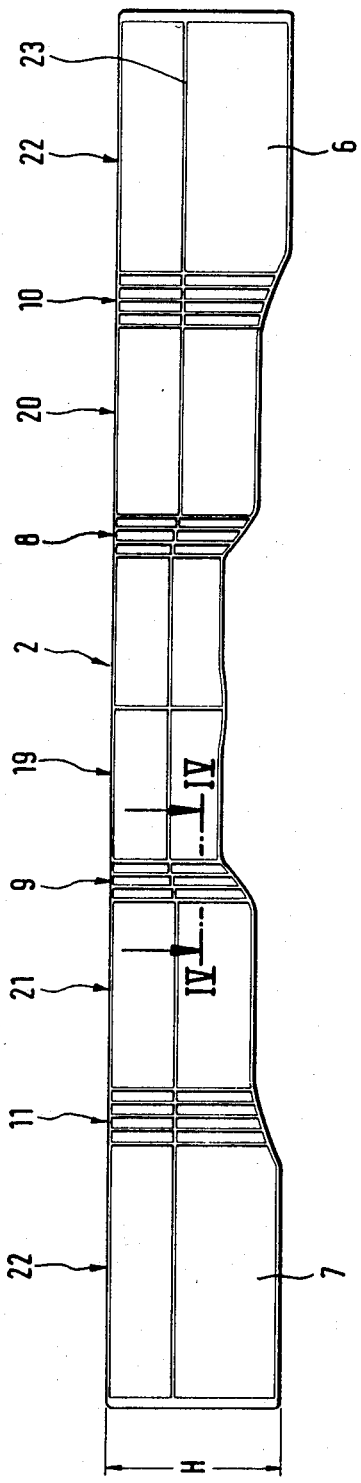
FIG. 3 is a plan view of a cellular-plastic unit forming part of the head guard of FIG. 1 in extended condition.
Figure 4:
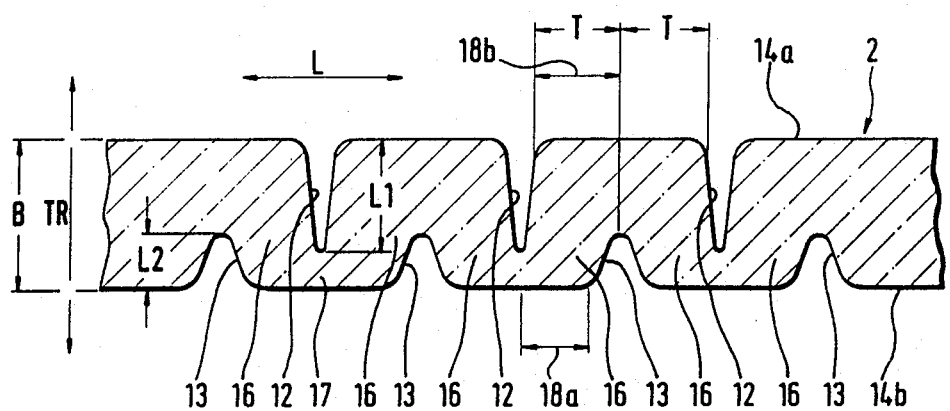
FIG. 4 is a view IV—IV of the cellular-plastic unit of FIG. 3.

The illustrated head guard has the shape of an annular brow-band 1, comprising a cellular-plastic unit 2 and a cover 3 of suitable material, e.g. a textile material, preferably in the form of a terry-cloth stocking. The cellular-plastic unit 2 is entirely or substantially entirely made of a cellular-plastic material, e.g. polyethylene, whereby the inner portions 4 of the unit 2 preferably consist of expanded polyethylene and a surface 5 of unexpanded polyethylene or polyethylene which is made less porous than said inner portions 4. The cellular-plastic unit 2 further comprises a longitudinal band of cellular plastic (see FIG. 3), the end porions 6, 7 of which have been glued or otherwise secured together to provide the annular shape. In the embodiment shown, the unit 2 of cellular plastic is provided with four adjustment portions 8, 9 and 10, 11 respectively. Each adjustment portion 8 or 9 includes depressions 12, 13 provided in the cellular-plastic unit 2, whereby the depressions 12, 13 protrude into said unit alternately from an inner side 14a and an outer side 14b respectively, of the unit 2. Thus, the depressions 12 protrude from that inner side 14a of the cellular-plastic unit 2 which is adapted to face inwardly towards the head 15 of the person wearing the head guard. The depressions 13 however, protrude from that outer side 14b which is adapted to face outwardly from the head 15. The depressions 12, 13 define pads 16 of cellular plastic, whereby each pair of adjacent depressions 12, 13 defines a cellular-plastic pad 16. Thus, the adjustment portions 8, 9 each have six such cellular-plastic pads 16, while the adjustment portions 10 and 11 each include eight cellular-plastic pads 16. The depressions 12, 13 protrude into the cellular-plastic unit 2 substantially in a transverse direction relative to the longitudinal direction L of said unit (see FIG. 4), and the cellular-plastic pads 16 also extend substantially in this transverse direction T (see FIG. 4) relative to the longitudinal direction L.

Since the unit 2 is made of an elastic cellular-plastic material and the pads 16, as well as the connecting portions 17 connecting said pads together also consist of such elastic material, the pads and the connecting portions permit a limited stretching or elongation of the unit 2 in its longitudinal direction. The depressions 12, 13 afford the adjustment portions 8–11 less resistance to stretching of the cellular-plastic unit 2 than other portions of the unit, but the degree of stretching is limited. The connecting portions 17 and the cellular-plastic pads 16 prevent said pads from "laying down" so that they extend substantially in the longitudinal direction L of the cellular-plastic unit 2 instead of substantially in its transverse direction TR. A maximally stretched adjustment portion 8 is shown in FIG. 6, from which it appears that the cellular-plastic pads 16 of said adjustment portion 8 still extend substantially in the transverse direction TR.

By means of said stretching ability of the adjustment portions 8–11, the head guard is easy adaptable to the size and/or shape of the head 15 while maintaining the required protective effect therearound. Due to the elastic properties of the adjustment portions 8–11, it is also ensured that the head guard maintains a secure grip in position around the head 15.

Figure 6:
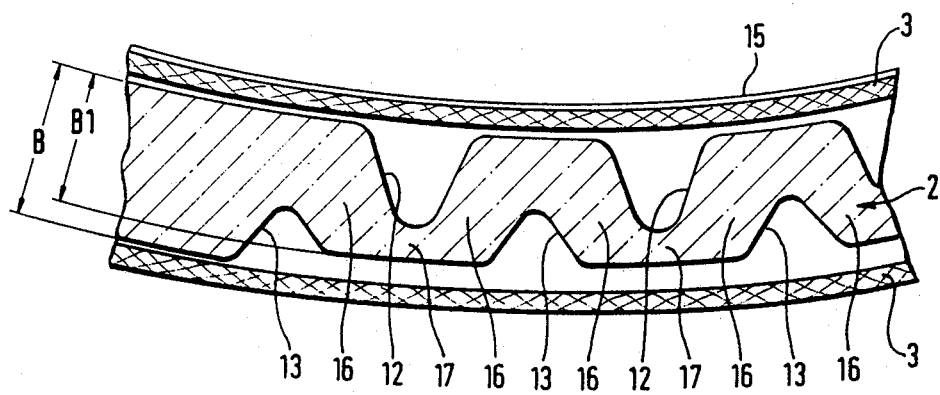
FIG. 6 is a section corresponding to FIG. 5 through the head guard in a more stretched condition.

In order to ensure that in many embodiments of the head guard, the adjustment portions 8–11 maintain the required protective effect when stretched, the adjustment portions are preferably maximally stretchable until their width B (see FIG. 6) is reduced by half B1 at the most (see FIG. 6).

Figure 5:
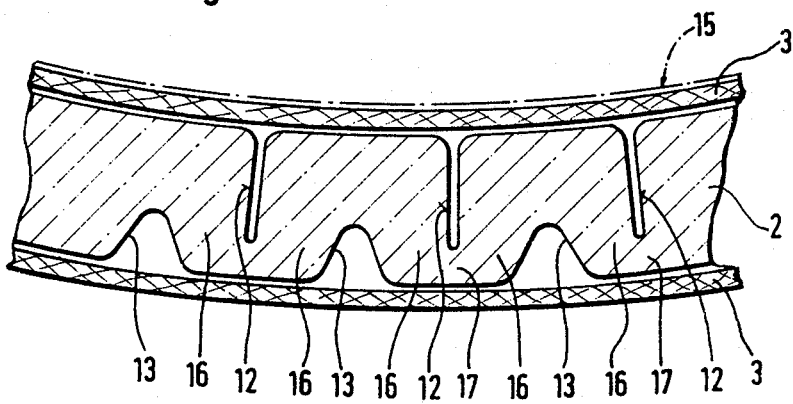
FIG. 5 is a section V—V through the head guard of FIG. 2.

The depressions 12, 13 preferably taper inwardly into the cellular-plastic unit 2. While the inner depressions 12 have such a shape, the inner side 14a of the length of the adjustment portions 8–11 in the longitudinal direction L of the cellular-plastic unit 2 may decrease by changing the shape of the cellular-plastic unit 2 such that the originally "gaping" depressions 12 are closed (see FIG. 5). This is advantageous since hereby, the head guard is better adapted to heads 15 of smaller sizes.

The inner depressions 12 preferably have a length L1 which is equal to or larger than half the width B of the adjustment portions 8–11 when said portions are not stretched. The outer depressions 13 however, are preferably of a length L2 equal to or smaller than half the width B of the adjustment portions 8–11 when said portions are not stretched. Hereby, the adjustment portions 8–11 attains a frequently very advantageous combination; maximum stretch/favorable protective effect/favorable elasticity.

The pads 16 of cellular plastic are preferably as thick or almost as thick (T in FIG. 4) as their height (B in FIG. 4) when the adjustment portions are not stretched. Additionally, each cellular-plastic pad 16 preferably has an outer planar or substantially planar stopping portion 18a and an inner planar or substantially planar support portion 18b, whereby at least a part of the stopping portion 18a, seen from the outside, is positioned straight outside or directly opposite at least a part of the support portion 18b (see e.g. FIG. 4). Such an embodiment of the cellular-plastic pads 16 permits the adjustment portions 8–11 to impart a very advantageous protective effect.

The cellular-plastic unit 2 of the illustrated browband in the shape of a longitudinal strip, comprises a protective portion 19 adapted for protecting the brow and positioned between the adjustment portions 8 and 9, two protective portions 20 and 21 for the temples positioned between the adjustment portions 8 and 10 and 9 and 11 respectively, and a protective portion 22 for the back of the head defined by the end portions 6, 7 of the strip when attached to each other. These protective portions 19–22 preferably lack transverse or substantially transverse depressions and are therefore less elastic than the adjustment portions 8–11. The strip preferably has the same width B in unstretched condition, which means that the adjustment as well as protective portions 8–11 and 19–22 respectively, also have the same width B in unstretched condition.

In order to that the head guard preferably shall have a rather large height H (see FIG. 3) and also be able to adapt to the head 15 such that it follows the flexure of the head, the cellular-plastic unit 2 is preferably provided with at least one longitudinal depression 23, which preferably extends along the entire or at least the major part of the cellular-plastic unit 2. This depression 23 protrudes into the cellular-plastic unit 2 from the outside 14b thereof and it preferably has a length which is equal to or less than half the width B of said unit 2.

This longitudinal depression 23 preferably extends in the center or substantially in the center of the cellular-plastic unit 2, permitting unit 2 to easily fold somewhat in the middle in order to better adapt to the shape of the head 15.

Figure 1:
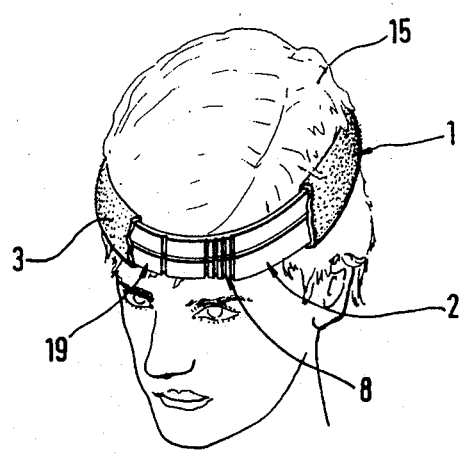
Figure 2:
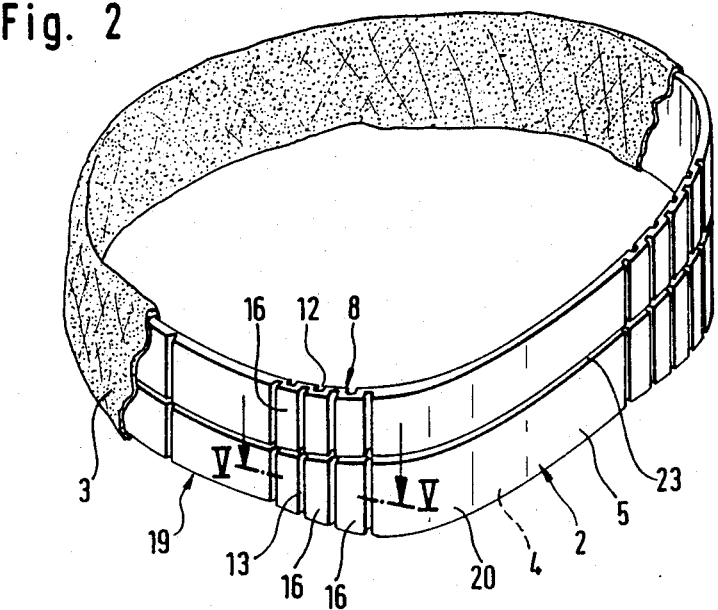
FIG. 2 is an enlarged view of the head guard of FIG. 1.
Figure 8:
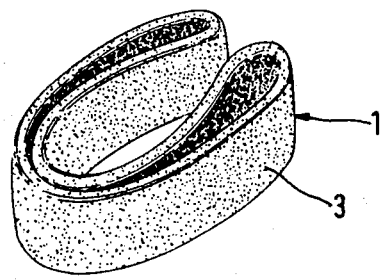
FIG. 8 illustrates the head guard of FIG. 1 in a folded condition.

The cellular-plastic unit 2 and especially its adjustment portions 8–11 as well as the cover 3 permits folding of the brow-band (see FIG. 8) so that it can be put away, e.g. in the pocket, when not used.

The brow-band described above has a very low weight, is adaptable to heads of various size, follows exactly the shape of the head, sits firmly on the head, provides good protection therearound and is easy to fold and/or roll and put away after use.

Figure 7:
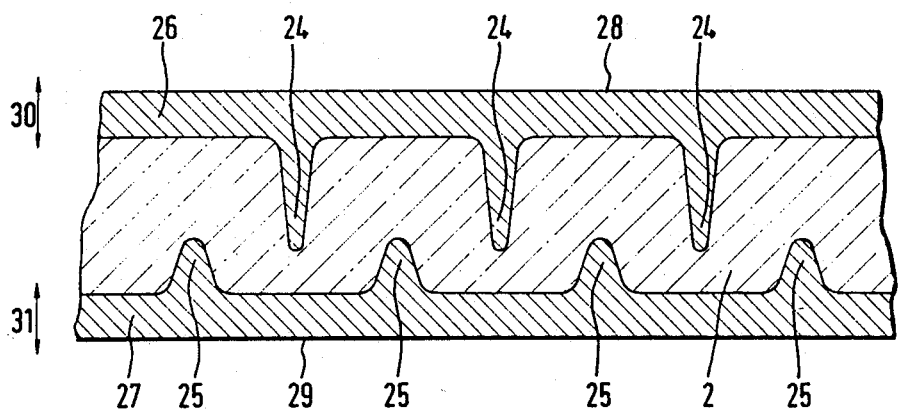
FIG. 7 illustrates a portion of the cellular-plastic unit forming part of the head guard during a manufacturing step.

The head guard according to the invention may be manufactured in different ways, whereby an especially suitable method of manufacture is carried out by pressing heated blades 24, 25 into a cellular-plastic unit 2 of preferably uniform width for providing depressions 12, 13 (see FIG. 7). Other portions of the cellular-plastic unit 2 are subjected to warm processing means 26, 27 such that said unit 2 gets a surface which is less porous than the parts lying within said surface. Due to this method the cellular-plastic unit 2 receives a protective surface which successively, i.e. without a sharp transition, transcend into more porous parts of the unit within said surface.

For manufacturing the cellular-plastic unit according to the above principles, various types of heatable devices may be used. The processing means 26 and the blades 24 may e.g. be formed by a heatable jaw 28 and the processing means 27 and the blades 25 by another heatable jaw 29. These jaws 28, 29 are preferably moveable towards each other (see arrows 30 and 31 respectively in FIG. 7). The manufacturing proceeds in this case such that e.g. a cellular-plastic unit 2 with entirely uniform width and without depressions is positioned between the jaws 28, 29. These jaws are brought together in heated condition, whereby they form the depressions in the cellular-plastic unit 2 and subject its surface to heat so that this surface becomes less porous than other parts of the unit.

The brow-band described above is a suitable variant of the head guard of the invention and the manufacture described above is advantageous in many ways. However, the invention may vary within the scope of the following claims in view of its shape as well as of its use. Thus, certain parts of the cellular-plastic unit may be of another material than cellular plastic and/or another material, e.g. reinforcement steel, may be embedded in the cellular plastic. The cellular-plastic material may be of another type than polyethylene and a possible variant is that the unit throughout is made of expanded cellular plastic without an especially hardened or otherwise differing surface. It is also possible to provide the cellular-plastic unit with a rather hard surface which either successively transcends into softer cellular-plastic material or forms an outer layer to softer cellular-plastic material. Each adjustment portion may have an optional number of cellular-plastic pads positioned beside each other and the number of adjustment portions may be one or more. Alternatively, it is possible to design the head guard with an all-around adjustment portion, i.e. without protective portion or portions, whereby this single adjustment portion however, eventually may be interrupted at any point or points. The depressions may have another length than described above and the height and/or width of the cellular-plastic pads may be other than stated herein. The stopping and support portions of the cellular-plastic pads may also have another shape than described and their mutual position may eventually vary from what is described.

The cellular-plastic unit may have a uniform width in an unstretched condition as stated, but its width may vary along its length if this is preferred in any embodiment. In the same manner the height of the head guard may vary along its length.

The head guard may be a brow-band with a cover of another suitable material and another suitable shape than a terry-cloth stocking. The head guard however, may alternatively be an annular band provided in a cap which is folded around the band. Hereby, the band is completely covered by the cap and have the same advantageous properties as a free-lying brow-band. Another possible variant is that the head guard forms part of a helmet which completely or partially extends up above the head.

I claim:

1. A head guard in the form of an annular brow-band comprising:
   (a) a longitudinal annular unit including an inner side and an outer side;
   (b) a plurality of adjustment portions longitudinally spaced along the annular unit;
   (c) each adjustment portion being at least substantially entirely formed of cellular plastic and including a plurality of first depressions protruding inwardly from the outer side and a plurality of second depressions protruding outwardly from the inner side, the first and second depressions alternating with each other to define a plurality of pads therebetween;

(d) the pads extending substantially transversely of the annular unit and including connection portions connecting adjacent pads together to permit a limited stretching of each adjustment portion in the longitudinal direction for conforming the annular unit to the size and shape of a head; and (e) each pad including a substantially planar stopping portion on the outer side and a corresponding substantially planar support portion on the inner side, with at least a part of the stopping portion being positioned directly opposite a part of the support portion to impart a protective shock absorbing capability to the pad.

2. The head guard of claim 1 wherein each adjustment portion is defined by an original width and is capable of stretching in the longitudinal direction up to a maximum one-half reduction of the original width.

3. The head guard of claim 2 wherein:
(a) the first and second depressions are each of a tapered configuration in their corresponding protruding direction;
(b) the first depressions each have a length that is equal to or less than one-half the original width of the adjustment portion; and
(c) the second depressions each have a length which is equal to or larger than one-half the original width of the adjustment portion.

4. The head guard of claim 1 wherein each shock absorbing pad is defined by a thickness in the longitudinal direction and a height in the transverse direction, wherein the thickness and height are substantially equal when the adjustment portion is in an unstretched condition.

5. The head guard of claim 1 further including a plurality of protective portions longitudinally spaced along the annular unit and disposed between adjacent adjustment portions, the adjustment and protective portions being of substantially the same width when the adjustment portions are in their unstretched condition.

6. The head guard of claim 5 wherein the protective portions are positioned along the annular unit to define one protective portion for the brow of the head, one protective portion for the back of the head, and two protective portions for the temples of the head, and four adjustment portions disposed between the protective portions.

7. The head guard of claim 1 wherein the annular unit further includes at least one longitudinal depression protruding inwardly from the outer side to facilitate conforming the head guard to the head.

8. The head guard of claim 1 wherein the annular unit is elastic and completely formed of cellular plastic material including an internal portion formed of expanded cellular plastic and an external surface formed of unexpanded cellular plastic, and the unexpanded cellular plastic successively transcends into the expanded cellular plastic.

9. The head guard of claim 1 further including a cover formed of textile material enclosing the annular unit, whereby the adjustment portions and the cover collectively permit folding of the head guard.

10. A method of manufacturing a head guard comprising the steps of:
(a) providing a longitudinal annular unit at least substantially entirely formed of cellular plastic material;
(b) pressing a plurality of heated blades into the annular unit from opposite sides thereof to form a plurality of first depressions protruding inwardly from an inner side and a plurality of second depressions protruding inwardly from an outer side; and
(c) engaging the annular unit with warming means to form an outer surface that is less porous than the internal portion of the unit.

* * * * *